United States Patent [19]

Elixmann et al.

[11] Patent Number: 5,987,511
[45] Date of Patent: *Nov. 16, 1999

[54] COMMUNICATION SYSTEM CAPABLE OF EXCHANGING SOFTWARE AND RESTARTING WITH ALL INFORMATION PRESERVED

[75] Inventors: Martin Elixmann; Ralf Günther; Steffen Hauptmann; Josef Wasel, all of Aachen, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,745

[22] Filed: May 15, 1996

[30] Foreign Application Priority Data

May 18, 1995 [DE] Germany .............................. 195 18 266

[51] Int. Cl.$^6$ .............................. G06F 13/38; G06F 15/17
[52] U.S. Cl. ............................................. 709/221; 709/202
[58] Field of Search ............................ 395/200.32, 200.5, 395/200.51, 200.52, 712; 709/202, 220, 221, 222

[56] References Cited

U.S. PATENT DOCUMENTS

| | | | |
|---|---|---|---|
| 4,954,941 | 9/1990 | Redman | 395/712 |
| 5,155,837 | 10/1992 | Liu et al. | 395/500 |
| 5,295,263 | 3/1994 | Kojima et al. | 395/712 |
| 5,359,730 | 10/1994 | Marron | 395/712 |
| 5,410,703 | 4/1995 | Nilson et al. | 395/712 |
| 5,421,017 | 5/1995 | Scholz et al. | 395/712 |
| 5,613,133 | 3/1997 | Bell et al. | 395/712 |
| 5,764,992 | 6/1998 | Kullick et al. | 395/712 |
| 5,797,016 | 8/1998 | Chen et al. | 395/712 |

OTHER PUBLICATIONS

Paindaveine et al., "Process vs. Task Migration," Proceedings of the 29th Annual Hawaii International Conference on System Sciences, IEEE, 1996.

Barak et al.., "Performance of PVM with the MOSIX Preemptive Process Migration Scheme,"Proceedings of ICCSSE, IEEE, 1996.

Increasing System Availability through On–Line Software Version Change Deepak Gupta, Pankaj Jalaote—Department of Computer Science and Engineering Indian Institute of Technology, Kanpur–208016; India.

The Service Configurator Framework—An Extensible Architecture for Dynamically Configuring Concurrent, Multi–Service Network Daemons–Douglas C. Schmidt and Tatsuya Suda.

*Primary Examiner*—Mark H. Rinehart
*Assistant Examiner*—Daniel Patru
*Attorney, Agent, or Firm*—Steven R. Biren

[57] ABSTRACT

A communication system with a control circuit is disclosed. The circuit includes an operating system for exchanging messages and user software, and a device for exchanging software. For a software component to be exchanged in a few milliseconds, a newly loaded software component, corresponding to a successor component, obtains states and messages from a service port of a stopped software component that is to be replaced, corresponding to a predecessor component. The successor component is restarted with the transferred states and messages.

4 Claims, 3 Drawing Sheets

COMMUNICATION SYSTEM CAPABLE OF EXCHANGING SOFTWARE AND RESTARTING WITH ALL INFORMATION PRESERVED

CROSS REFERENCE TO RELATED APPLICATIONS

This is a continuation of application Ser. No. 08/649,745, filed May 15, 1996.

BACKGROUND OF THE INVENTION

1. Field of the Invention

The invention relates to a communication system with a control circuit the circuit comprising an operating system and user software and means for exchanging software.

2. Discussion of the Related Art

Communication systems comprise computer systems or control circuits hose software is to be durable and practically always available. In the event of errors in the software or also because of new requirements, certain software components are to be renewed. In that case the down-time of the communication system is to be minimized.

A communication system which has practically no down-time when software of a component of a switching system is to be exchanged is known from U.S. Pat. No. 5,155,837. Before the exchange, first the contents and states of all the registers, processors and memory units are saved in a special memory while the old software is being used (column 7, lines 30 to 36). The old version of the software is then loaded into a first partition. Subsequently, the new software is loaded into a second partition. After the new software has been loaded and tested, the contents and states of all the registers, processes and memory units in the memory are copied to the new software. This new software is then taken into operation. The new software, however, does not start operating at the point in the process where the old software was stopped, but at a defined program point. Neither are individual software modules or software components exchanged, but only software incorporated therein.

SUMMARY OF THE INVENTION

Therefore, it is an object of the invention to exchange software components during which exchange the operation is not affected by constraints apart from a brief delay.

The object is achieved by a communication system of the type defined in the opening paragraph, in that the operating system exchanges messages and in that a newly loaded software component (successor component) receives the states and messages from the service port of a stopped software component to be replaced (predecessor component) and restarts with the copied states and messages.

The invention makes it possible to restart the new software component at the program point at which the old software component was stopped. Furthermore, all the states of the old software component are copied to the new software component. However, this can only apply to such systems that comprise an operating system which makes it possible to exchange messages between software components. Messages are then exchanged between various processes via software interfaces which will henceforth be denoted ports. According to the invention, all the states and all the messages available at a service port are collected in the old software components and copied to the new software component. The software component receives all the messages from other processes through a service port. The new software component takes over the new states, transforms a state, as required, and starts the new software at the program point of the new software component that corresponds to the one of the old software component.

A software component is then exchanged in such a way that no other software component is affected thereby. The messages coming in from another software component are copied to the new software component and further processed after the exchange. The exchange is then made so that only a short delay arises during processing. Practical tests have established that the delay lies in the range of a few milliseconds.

A communication system may be a computer system, a switching center, a computer network, but also server systems such as, for example, a Video-On-Demand server. A computer system comprises at least a computer in which a software component is to be exchanged.

A software component or a process comprises exactly one thread. A thread is a basic block sequentially running autonomously. The thread has a first part for taking over and properly converting the states and messages of the service port of an old software component, and a second part for collecting the states of the process and of the messages of the service port.

The exchange of a software component is controlled by an exchange manager which is used for loading and starting a software component. It is likewise possible for a maintenance device at which also new software components may be developed to supply the new software component to the exchange manager. For example, the telephone network may be used as a transmission medium.

These and other aspects of the invention will be apparent from and elucidated with reference to the embodiments described hereinafter.

DETAILED DESCRIPTION OF THE PREFERRED EMBODIMENTS

Figure 1:
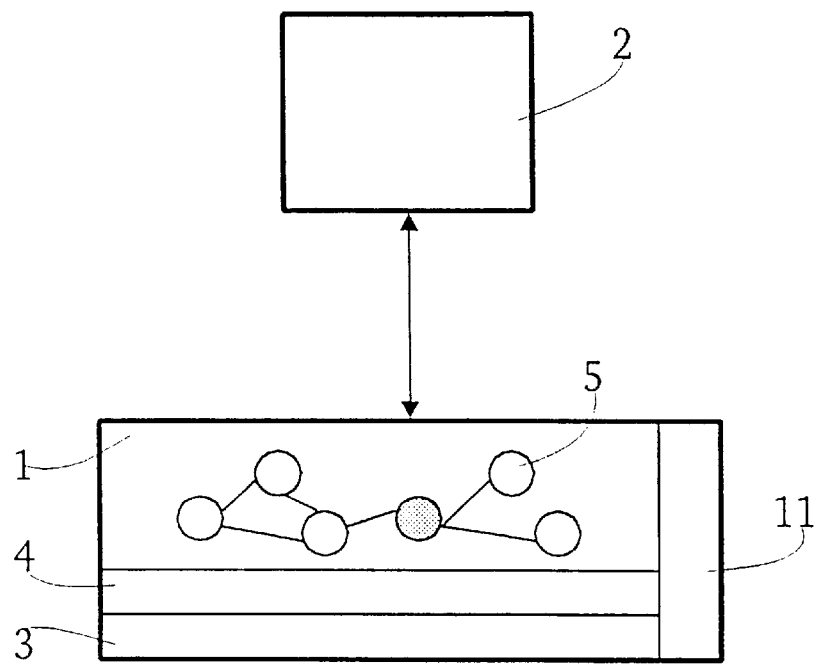
FIG. 1 shows a computer system with a maintenance device and a computer, which computer comprises exchangeable software components.

FIG. 1 shows a computer system with a computer 1 and a maintenance device 2. The computer comprises hardware components 3, an operating system 4, user software 5 and an exchange manager 11. The operating system 4 is to make a communication possible between software components of the user software 5 via messages (for example, message-based operating system). The messages or data are then exchanged via software interfaces. In the following a software interface will be referenced a port.

The exchange manager 11 is a software program with the aid of which components of the user software 5 can be exchanged. In FIG. 1 the individual software components are represented by circles. The lines between the circles denote message flows between the software components.

The maintenance device 2 might be a remote computer from which a new software component is supplied. It is then conceivable that the new software component is developed and tested on that computer. For transmitting the new software component, it is possible to use known transmission media and protocols. For example, a transmission by telephone network is possible. The new software component, however, could also be loaded directly in the computer 1 (for example, via a local maintenance device (laptop)).

The exchange manager 11 loads the new software component in the computer 1 and starts it there. The new component reports to the exchange manager 11 and is informed whether it is to replace an existing old component. If this is the case, the new component which represents a successor component sends an exchange request to the old component which represents a predecessor component. The predecessor component collects its state information and transmits this state information to the successor component. Furthermore, the predecessor component reports to the exchange manager 11 that it has stopped. Subsequently, the successor component carries on the operation at the exact point at which the predecessor component stopped. For this exchange to be carried out without the computer being taken out of operation, the components of the user software further contain specific changes which the non-exchangeable components do not.

As stated above, the software components which are to be exchangeable are to contain extensions compared with conventional software components. A software component is exactly one thread that has a service port for receiving messages from a client and a part for responding to the messages of a client. A thread is a program point sequentially running autonomously. A client is another software component (process). For a software component to become exchangeable, the component is to have an exchange point or restart point in the thread. As a rule, the exchange point and the restart point are identical.

Figure 2:
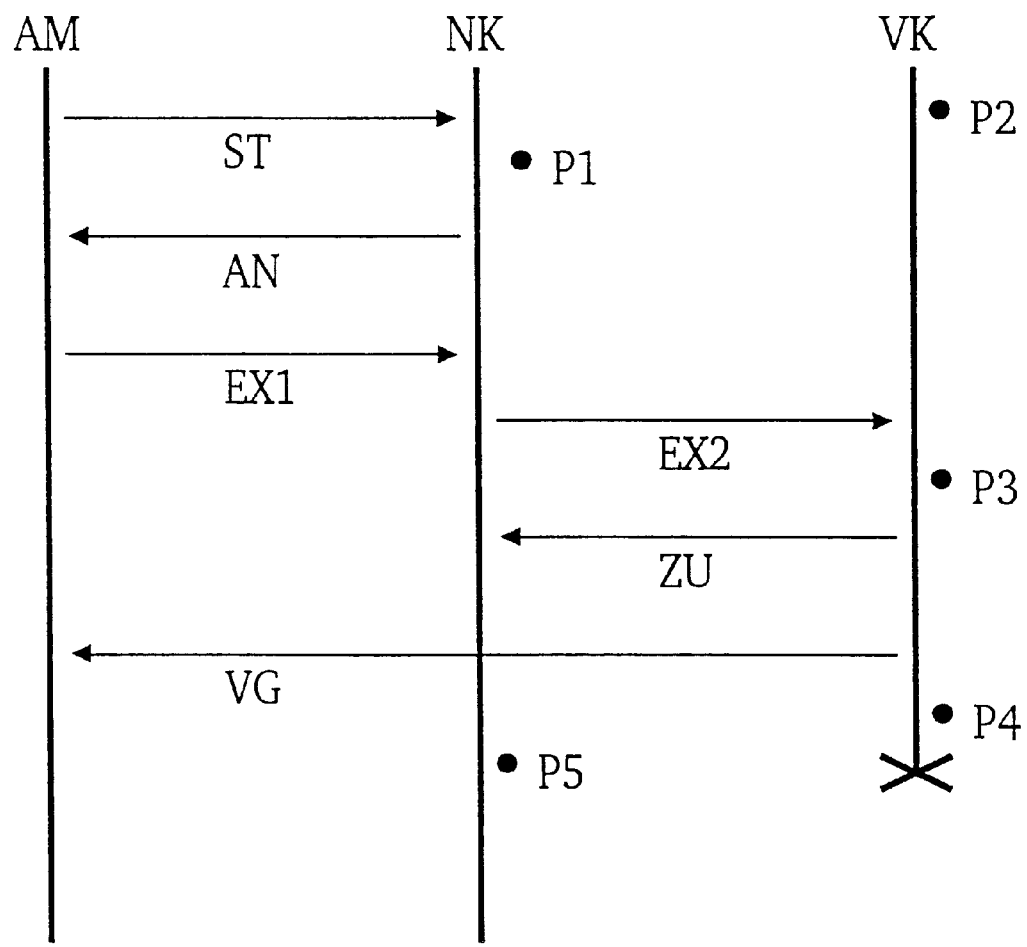
FIG. 2 shows the message flow between the exchange manager of a new and an old software component.

FIG. 2 shows in a diagram the message flow between the exchange manager 11 (referenced AM here), the predecessor component VK and the successor component NK. After the new component NK has been started by the exchange manager (arrow ST), specific information signals are taken from this component (point P1). The predecessor component VK makes it possible at point P2 to accomplish its tasks i.e. for example, the processing of external, available messages. The successor component NK then reports to the exchange manager 11 (AM) (arrow AN), which manager subsequently orders the successor component NK to perform the exchange of components (arrow EX1). This order is transferred by the successor component NK to the predecessor component VK (arrow EX2). Then, the predecessor component VK collects its state (point P3) and supplies this state to the successor component NK (arrow ZU). The successor component NK reconstructs the object from the received states and transforms the state, as required. All the messages intended for a service port of the predecessor component VK during the exchange operation, are thus transferred to the service port of the successor component NK. Subsequently, the predecessor component VK reports to the exchange manager 11 (AM) that it has stopped (arrow VG) and deletes itself (point P4). The new component NK then takes over at the processing of the external messages (point P5).

Figure 3:
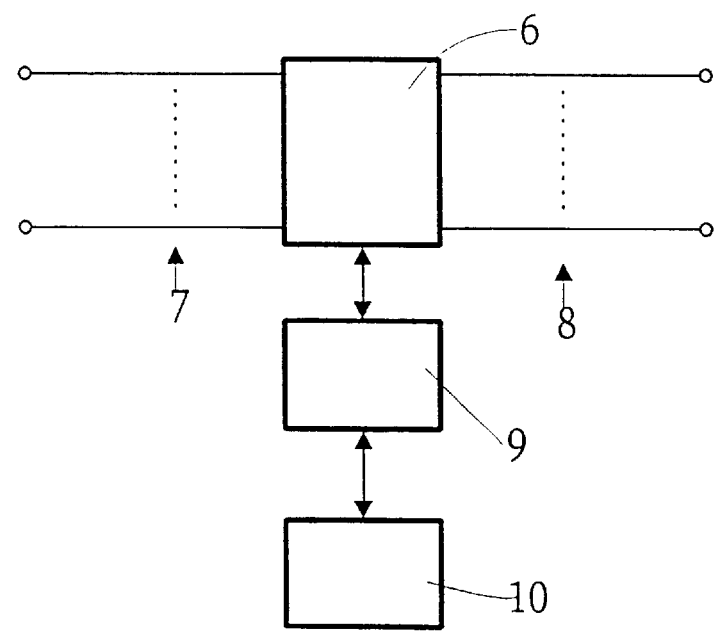
FIG. 3 shows a switching system with a maintenance device and a control circuit the circuit including exchangeable software components.

The computer 1 could also be, for example, a server in a computer network. There is a further application option for systems which are provided for transmitting messages. An example thereof is a switching system whose essential blocks are shown in FIG. 3. The switching system comprises a switching network 6 which transfers signals received on input lines 7 to one or more output lines 8. A control circuit 9, which comprises not only the necessary hardware components but also an operating system, user software and an exchange manager, is used for controlling the switching network. For exchanging components of the user software there is a maintenance device 10 which cooperates with the control circuit 9 in the same manner as the maintenance device 2 cooperates with the computer 1.

By means of a process written in the programming language C++, the structure of an exchangeable software component will be further explained in more detail in the following. First there will be described the conventional structure of the process without the measures according to the invention which are necessary for the exchange. The process makes it possible to manage a telephone directory by means of voice entries. The telephone directory (phonebook) process renders three methods available to other processes. First of all the addition of an entry to the phonebook, secondly deleting an entry from the phonebook and thirdly determining an entry from predefined voice data. To this end, a process supplies a message to the phonebook process, from which message the respective desired method is determined. The implementation of the phonebook process is as follows:

```
(1)  #include "audiodat.hxx"     // 'audiodata' class for voice
                                 // representation
     #include "bin.hxx"           // message-buffer-class 'bin'
     #include "port.hxx"          // port-class 'port'
     #include "s.hxx"             // string-class 'S'
     #include "thread.hxx"        // thread-class 'thread'
(3)  class phonebook {
     // ...   Here are the definitions of the internal
     //       data structures of the phonebook.
     public:
         void enter(S name, unsigned phone number, audiodata reference) {
         // ...   Entry of a name with telephone number and
         //       voice reference in the phonebook
         }
         void remove(S name) {
         // ...   Delete from the phonebook an entry referenced
         //       by the name }
         void give(AudioData reference, S& name, unsigned& phoneNumber) {
```

```
            // ...  Find an entry in the phonebook based on
            //      a voice reference
        }
    };
(8)  enum Request { Enter, Remove, Give };
(9)  Port* phoneBookEntry;      // Message address for my clients
     PhoneBook* phoneBook;      // Represents the phonebook
(10) void phoneBookService( ) {
(13)     phoneBookEntry = new Port("phoneBookEntry", Port::Overtype);
         phoneBook = new PhoneBook;
(14)     while(1) {
(15)         Bin message; phoneBookEntry->receive(message);
                 int request;
                 message >> request;
                     // Extracts type of called method from received
                     // data
(16)             switch(request) {
                     case Enter: {
                         S name; unsigned phoneNumber; AudioData
                         reference; message >> name >> phoneNumber >> reference;
                         phoneBook-> enter(name, phoneNumber, reference);
                     }
                     break;
                     case Remove: {
                         S name;
                         message >> name;
                         phoneBook->remove(name);
                     }
                     break;
                     case Give: {
                         AudioData reference; S name; unsigned
                         phoneNumber;
                         message >> reference;
                         phoneBook->give(reference, name, phoneNumber);
                         message clear( );
                         // Delete, because message is used for reply
                         message << name << phoneNumber;
                             // Composition of reply
                         reply(message);
                     }
                     break;
                 }
             }
         }
(18) Thread pBS(phoneBookService);
         // Declares and starts the thread of the voice controlled phonebook.
```

In the implementation represented above, only the declarations are discussed which are necessary for understanding the phonebook process. The program has section numbers for reference purposes, which section numbers do not form part of the program text. Individual control sections are featured each time by numbers in brackets preceding the lines.

In the sections (1) and (3) are contained imports and declarations of classes of objects which are used in the phonebook process. In section (1), several libraries (header data files) are included in the process, which render various further classes available. The meanings of the individual libraries are explained in the lines of comment.

Section (3) shows the definition of an internal phonebook class "phoneBook". The implementations for "Enter", "Remove" and "Give" are not shown separately. The "Enter" method allows of the entry of a name with a telephone number and voice reference (voice sample) in the phonebook, the "Remove" method allows of removing from the phonebook an entry referenced by the name, and the "Give" method allows of finding an entry in the phonebook, which entry is based on a voice reference. In this case somebody searches for entries under a name he pronounces. The "enter", "remove" and "give" methods obtain and transfer the parameters indicated in brackets for the respective methods.

In section (8) are stated the methods which are rendered available to other processes by the phonebook process. Section (9) defines the port (service port) through which the phonebook process is called by other processes. A port is used for sending messages to other processes. In section (9) the phonebook object "phoneBook" is declared, which, just like the previous port declaration, forms the state of the software object. The object "phoneBook" manages all the relevant data of the phonebook.

In the sections (10) to (16), the main function of the phonebook process is stated. This function is called thread. The thread consists of an initialization part in section (13) and an endless loop (from section (14)), in which the method calls are received (section (15)) and in which the method calls are carried out (section (16)). In the initialization part in section (13) the initial state of the software object is set. In the loop, which starts with section (14), a request is waited for. If a message has been received from the service port (section (15)), this message is stored in the message buffer. The message always contains first the type of the called method and additional parameters which depend on the method. Depending on the type (Request), either the "Enter" method, or "Remove" method or "Give" method is jumped to. The "Enter" method enters the name, the telephone number and a voice reference in the phonebook object. The "Remove" method removes from the phonebook object "phoneBook" the name with the associated entries. For the "Give" method, for example, a voice reference is sent, which is stored in a variable "reference" of the "Audio-Data" type. Via a call of the "Give" method of the internal object "phoneBook", a user name "name" and a telephone number "phoneNumber" are determined and sent by means of the "reply" order to the client who asked for the respective telephone number. In section (18) is stated a declaration by which the thread is instantiated by which the "phoneBook-Service" function is connected and started. The "phone-BookService" function starts from section (10).

Figure 4:
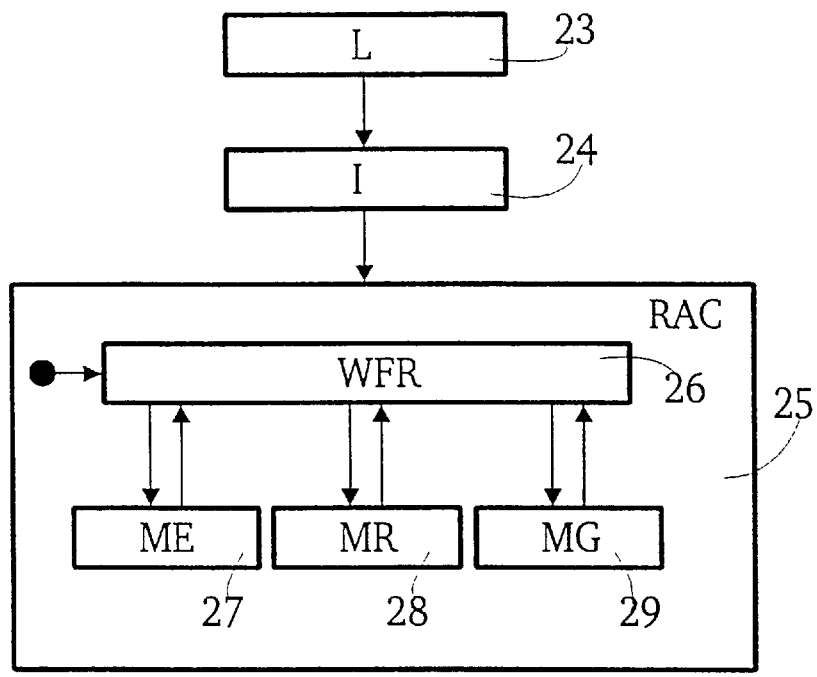
FIG. 4 shows a state diagram of a non-exchangeable software component.

The procedure of the threads may be further clarified by the state diagram shown in FIG. 4. Block 23 denotes the state (state L, loaded) in which the whole software object was loaded by the exchange manager 11 in the working memory of computer 1 or of control circuit 9. After the initialization, the thread goes to an initialization state (state I, initialized) which is denoted by block 24. The next state RAC (running application code) shows the actual execution of the thread (block 25) and is described in the program by the sections (14) to (16). The state RAC has further sub-states WFR (block 26, waiting for requests), ME (block 27, processing "enter"), MR (block 28, processing "remove") and MG (block 29, processing "give"). The arrow with the dot to the left of block 26 features the sub-state which is taken up when the program in the higher state commences. In the concrete example this means that the state RAC always starts with the sub-state WFR. In the state WFR, messages are waited for. After a message has arrived, one of the states ME, MR or MG is jumped to. These states correspond to the execution of the methods "Enter", "Remove", and "Give". After one of the methods has been terminated, the state WFR is jumped back to.

For effecting the exchange of a software component, the phonebook process described above can be extended by further declarations. These additional sections and the sections already described above of the phonebook process are listed as follows:

```
(1)     #include "audiodat.hxx"   // Class 'AudioData' for voice
                                       representation
        #include "bin.hxx"        // Message buffer class 'Bin'
        #include "port.hxx"       // Port class 'Port'
        #include "S.hxx"          // String class 'S'
        #include "thread.hxx"     // Thread class 'Thread'
(2)     #include "exchange.hxx"   // Defines 'getExcInfo' and
                                       'setExcInfo'
(3)     class PhoneBook {
            // ...   The declared internal data structures of the
            //       phonebook are to be changed here
        public:
            void enter(S name, unsigned phoneNumber, AudioData reference) {
                // ...   Enter a name with phone number and voice
                //       reference in the phonebook.
            }
            void remove(S name) {
                // ...   Delete a name-referenced entry from the
                //       phonebook.
            }
            void give(AudioData reference, S& name, unsigned& phoneNumber) {
                //...   The implementation (not shown here)
                //      of this method has been improved.
            }
            PhoneBook( ) {};    // Standard constructor
(4)         PhoneBook(Bin buf) {
                // ...   Additionally required constructor for
                //       generating the object from a buffer image.
            }
(5)         static Bin& operator<<(Bin& buf) {
                // ...   Additionally required method for storing
                //       the object state in a buffer.
                return buf;
            }
        };
(6)     class OldPhoneBook {
        public:
            OldPhoneBook(Bin buf) {
                // ...   For generating an old object from the
                //       received state
            }
                // ...   The remaining interface is identical with
                //       the software object to be exchanged.
        };
(7)     PhoneBook stateTransformation(OldPhoneBook phoneBook) {
            PhoneBook newPhoneBook;
                // ...   This function performs the necessary
                //       transformation from the old 'phoneBook' to
                //       the new 'newPhoneBook'
            return newPhoneBook;
        }
(8)     enum Request { Enter, Remove, Give, Exchange };
(9)     Port* phoneBookEntry;       // Message address for my clients
        PhoneBook* phoneBook;       // Represents the phonebook
(10)    void phoneBookService( ) {
```

```
            Bin state;
(11)        if (getExcInfo("phoneBookEntry", Bin( ) << (int)Exchange, 10000,
                state)) {
(12)        phoneBookEntry = new Port(state);
                OldPhoneBook oldPhoneBook(state);
                phoneBook = new      PhoneBook(stateTransformation
                    (oldPhoneBook));
            } else {
(13)            phoneBookEntry = new Port("phoneBookEntry",
                    Port::Overtype);
                phoneBook = new PhoneBook;
            }
(14)        while(1) {
(15)            Bin message; phoneBookEntry->receive(message);
                    int request;
                    message >> request;
                    // Extracts type of called method from received
                    // data
(16)            switch(request) {
                    case Enter:
                        // ... no changes
                    case Remove:
                        // ... no changes
                    case Give:
                        // ... no changes
(17)                case Exchange: {
                        Bin state;
                        state << phoneBookEntry->migrate( ) << phoneBook;
                            // Collect state
                        delete phoneBookEntry; delete phoneBook;
                            // Remove still existing objects
                        setExcInfo(state); // No return from this
                                // function
                    }
                }
            }
        }
(18)    Thread pBS(phoneBookService);
            // Declares and starts the thread of the voice
            // controlled phonebook
```

The program run shown above is provided for the case where this software component is to replace another component (precedessor component), and for the other case where this software component is to be replaced by another new software component (successor component). The software component, which contains the measures according to the invention, utilizes an additional module "exchange.hxx" (section (2)), which renders two methods "getExcInfo" and "setExcInfo" available. The method "getExcInfo" renders the state information signals of the component to be replaced available to the new component. In contrast, the method "setExcInfo" gives state information signals of the actual component to a new, replacement component. Each thread calls at the beginning of its processing the method "getExcInfo" exactly once and finishes its processing with "setExcInfo" (cf. the program runs described below).

The declarations in section (3) are extended by additional method calls which are defined in the sections (4) and (5) following section (3). In principle, all the internal objects, in so far as they are not yet available, are extended by two further methods. One method is necessary for constructing the new state of the object of the successor component from the state of a similar object of the predecessor component (section (4)), and a further method to pack the state of the predecessor component in a form that can be sent as a message (section (5)). The method call "phoneBook" (Bin buf) is used which forms an object from a buffer image (section (4)). This method call is necessary when the described software component derives the state of its internal object "phoneBook" from the sent state of the "phoneBook" of the predecessor component. In addition, a method is called in section (5), which method allows of the storage of the object state in a buffer. This method is necessary when the software component (predecessor component) described here would like to send the state of its internal object "phoneBook" to a successor component.

In principle, it is permissible that the internal object of a successor component and the internal object of the component to be replaced (predecessor component) are not identical. In the illustrative embodiment this should be the case for the internal object "phoneBook". This incompatibility is eliminated in that a transfer function "stateTransformation" (section (7)) is rendered available. This function is to be capable of transforming the old type "OldPhoneBook" section (6) of the internal object "phoneBook" into its new representation. This is effected immediately after the state of the old object was received (see section (12)).

The section (8) indicates a further service rendered available by the object. This service "exchange" makes it possible to exchange the software component.

The thread of the phonebook process has two more program portions. One is for taking over the states of a predecessor component and the other part for transferring the states to a successor component. The fact whether a predecessor component exists is examined by means of the method "getExcInfo" (see below). If such a component exists, "getExcInfo" also conveys the state of the predecessor component. This state is used for reconstructing the internal object "phoneBookEntry" and "phoneBook" (section (12)). If no predecessor component exists, the component is started in a conventional manner (section (13)). The new service port is generated via the indications in the sections (12) and (13). All the unprocessed messages of the service port of the old software component form part of this state and are transferred. Furthermore, in section (12), the former state of the phonebook is extracted from the state buffer and stored in the "oldPhoneBook" variable. The state transfer function described above, which reflects the state of an old phonebook on the state of a new phonebook, is used in section (12). Such a transfer is necessary, for example, if a new "postcodes" field is added, or this field contains another type (for example, 5 instead of 4 digits).

The second new program part (section (17)) carries out the "exchange" service necessary for exchanging the component for a successor component. First, in section (17) the instantaneous state of the former software component (predecessor component) is stored in a "state" buffer. For example, the state including the messages of the "phoneBookEntry" service port are stored in the state buffer. The state of the former software component stored in the state buffer is sent by means of "setExcInfo" to the new software component (successor component) to be utilized. The "setExcInfo" method simultaneously aborts the software component.

Figure 5:
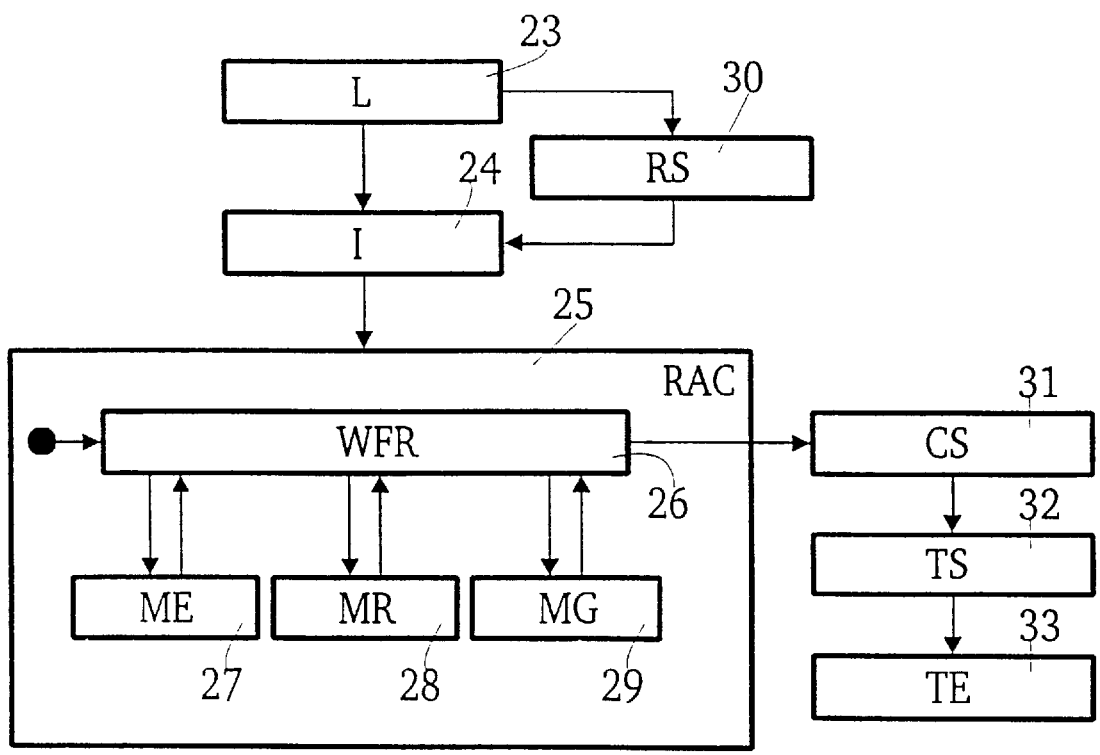
FIG. 5 shows a state diagram of an exchangeable software component.

The run of the thread in the software component with the measures according to the invention may also be described via a state diagram which is shown in FIG. 5. All the states which are identical with those of FIG. 4 have like references. The state RS (block 30, receiving state) indicates the state after a new start of the software component, in which the sending of the state of the former component is waited for. If the software component itself then produces an exchange signal at the end of its life, it changes to the state CS (block 31, collecting state). In this state it collects the states of its internal objects. The state TS (block 32, transferring state) denotes the transfer of the states from the old to the new software component. The termination of a software component is denoted by the state TE (block 33, terminated).

The module "exchange.hxx", which defines the methods "getExcInfo" and "setExcInfo", is listed as follows:

(1) #ifndef FLYER_EXCHANGE
    #define FLYER_EXCHANGE
(2) #include "bin.hxx"
(3) int getExcInfo(const char* portName, const Bin& excReqCode, int maxState, Bin& state);
(4) void setExcInfo(const Bin& state); #endif In section (1) a symbol "FLYER_EXCHANGE" is tested and, if not defined, set. This avoids the multiple inclusion (insertion) of this module. Section (2) includes the definition of the "bin" class. The "getExcInfo" method, which produces the state of information for the successor component, is defined in section (3). The method has the parameter "portName", "excReqCode", "maxState", "state" and "return". "portName" indicates the name of the port through which the performance of this software component is considered. "excReqCode" is a request code, which is to be sent to the old software component to be exchanged as an introduction to the exchange operation. The maximum size of the expected state in bytes is given by "maxState". In "state" is stored the thread state to be transferred. The return value of the "getExcInfo" function is equal to 0 (FALSE) if no exchange is to take place i.e. if the component is simply to be restarted.

In section (4), the method is defined which transfers the state information of the former thread of the predecessor component to the successor component, the information being stored in "state". The "setExcInfo" function does not return. The calling thread is deleted.

The "exchange.cxx" module, whose program run will be shown below, implies the implementation of the interface described in the "exchange.hxx" module.

```
(1)    #include "exchange.hxx"        // Description of own interface
       #include "excstub_.hxx"        // Interface to exchange
                                      //   manager 'ExcStub'
       #include "port.hxx"            // Defines 'Port'
       #include "thread.hxx"          // Defines 'mySelf'
(2)    const int False = 0, True = !0;
(3)    static ExcStub excStub;        // Interface to exchange
                                      //   manager only for internal
                                      //   name transfer
(4)    static S servicePortName;  // only for internal name
                                      transfer
(5)    int getExcInfo(const char* portName, const Bin& excReqCode, int maxState, Bin&
       state) {
              servicePortName = portName; // mark for 'setExcInfo'
(6)           // Report to exchange manager:
              ExcStub::ReplyCode rc = excStub.announce(servicePortName);
              if (rc == ExcStub::OkStart) return False;
              // no exchange, but restart
(7)           // Send exchange request to component to be exchanged
              Port servicePort(portName, Port::Reference);
              servicePort.call(excReqCode, maxState, state);
              // The request is sent and the old state is received.
              return True;
       }
(8)    void setExcInfo(const Bin& state) {
              reply(state);
              excStub.stopped(servicePortName);
              // Ready message to exchange manager
              mySelf( )-> deletes( );
       }
```

Section (1) includes imports and declarations respectively, of classes used. For example, "excstub_.hxx" renders an interface to the exchange manager 11 available. Section (2) defines the constants "False" and "True".

Section (3) declares an object "excStub" via which the exchange manager 11 is addressed. Section (4) declares a String-Object which is only used for information transfer (name transfer) between "getExcInfo" and "setExcInfo".

In section (5) begins the implementation of the "getExcInfo" method. In section (6) the software component reports to the exchange manager 11 and learns whether it is restarted or whether it is to replace an existing component (predecessor component).

If a predecessor component is to be replaced, a reference port is created in section (7), which reference port references the service port of the component to be replaced. The predecessor component is now sent an exchange command via "servicePort.call". Subsequently, the predecessor component sends back its state which is stored in "state" and is transferred as a "state" parameter of "getExcInfo".

Section (8) implies the implementation of "setExcInfo". First the collected "state" is returned to the sender of the exchange command ("reply(state)"). Then the exchange manager 11 is informed that the software component (predecessor component) has stopped ("excStub.stopped (servicePortName)") and the software component deletes itself.

We claim:

1. A communication system with a control circuit, the circuit comprising:

an operating system and user software; and means for exchanging software, wherein said operating system exchanges messages and wherein a newly loaded software component, corresponding to a successor component, receives all states and messages from a service port of a stopped software component to be replaced, corresponding to a predecessor component, and restarts with all of said copied states and messages, wherein an exchangeable software component comprises a thread, and wherein the thread comprises a first part for taking over and suitably converting the states and messages of the service port of an old software component and a second part for collecting the states of a process and the messages of the service port and wherein, in an event that there is a change of structure in the successor component relative to the predecessor component, the successor component carries out a state transformation.

2. The communication system as claimed in claim 1, wherein an exchange manager loads and starts a software component.

3. The communication system as claimed in claim 1, wherein a maintenance device supplies a new software component via a transmission medium to an exchange manager.

4. A computer system comprising:

a computer which includes an operating system and user software; and means for exchanging software, wherein the operating system exchanges messages and wherein a newly loaded software component, corresponding to a successor component, receives all states and messages from a service port of a stopped software component to be replaced, corresponding to a predecessor component, and restarts with all of said copied states and message, wherein an exchangeable software component comprises a thread, and wherein the thread comprises a first part for taking over and suitably converting the states and messages of the service sort of an old software component and a second part for collecting the states of a process and the messages of the service port and wherein, in an event that there is a change of structure in the successor component relative to the predecessor component, the successor component carries out a state transformation.

* * * * *